April 25, 1961   CLAES-WILHELM PILO   2,981,370
METHOD OF RECOVERING HEAT AND CHEMICAL PRODUCTS IN FLUE
GASES FROM THE COMBUSTION OF LIQUORS FROM
THE MANUFACTURE OF CELLULOSE PULP
Filed Dec. 30, 1957
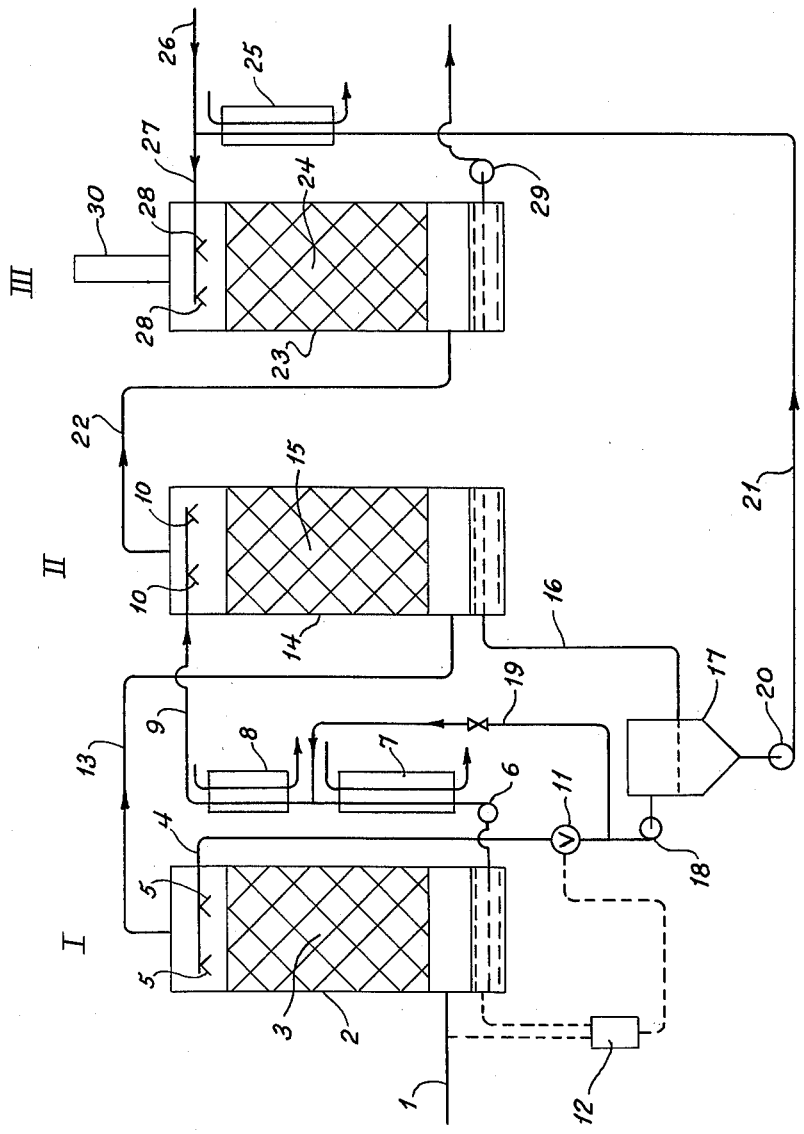
INVENTOR.
CLAES-WILHELM PILO
BY
ATTORNEY.

United States Patent Office 2,981,370
Patented Apr. 25, 1961

2,981,370

METHOD OF RECOVERING HEAT AND CHEMICAL PRODUCTS IN FLUE GASES FROM THE COMBUSTION OF LIQUORS FROM THE MANUFACTURE OF CELLULOSE PULP

Claes-Wilhelm Pilo, 2 Lovisagatan, Stockholm, Sweden

Filed Dec. 30, 1957, Ser. No. 705,838

3 Claims. (Cl. 183—115)

The main object of the present invention is to enable the simultaneous recovery of heat and chemical products in flue gas containing water or steam obtained from the combustion of waste cellulose liquors, in the first place from such liquors which on combustion give either moist ashes (for example sulphate liquor waste, sulphite waste liquor from boiling with digestion agents on sodium basis, and lye from the manufacture of semi-chemical pulp according to various processes), or very small quantities of ashes (for example liquors from boiling with ammonia as basic substance). The process can also be applied to flue gases without, or those which have been subjected to previous separation of dust and ashes, for example in mechanical dust-filters or electric filters (for example flue gases from combustion of calcium- or magnesium-sulphite waste liquors).

A further object of the invention is to treat the flue gas in two or possibly more consecutive stages, the first of which consists of a direct cooling of the gas close to its water dew-point with the aid of a cooling liquid, which does not dissolve water to any high degree, after which the gas is cooled in a second stage to the desired temperature below the water dew-point, possibly by means of the cooling liquid obtained from the first stage, and subsequently cooled to a suitable temperature. In both stages the dust or other substances separated from the flue gas are entirely or partially dissolved, or passed over to the hydrous phase condensed from the gas and are separated, together with this phase, from the cooling liquid which is subsequently entirely or partially returned to the first stage; after which, finally, the cooled flue gas from the second stage, if desired may be washed with a suitable absorption liquid in one or more stages in order to absorb existing gaseous substances from the gas.

Thus, according to the invention the gas is treated, in principle, as follows: In stage I the hot flue gas, which has, for example, a temperature of 250° C. to 100° C. is cooled to a temperature (for example about 70° C.) close to the water dew-point of the gas. This cooling is carried out directly with a liquid which does not dissolve water, at least not in a high degree. In stage II the gases emanating from stage I are cooled as far below the water dew-point of the original gas as can be appropriate considering ruling conditions. In so doing a corresponding quantity of water is condensed from the gas. The cooling is appropriately, but not necessarily, carried out with cooling liquid from stage I, the temperature of which first is decreased by cooling, suitably in conjunction with the recovering of heat, to a slightly lower temperature than that to which it is desired to cool the gas in sage II. The cooling liquid-water mixture obtained from this stage II is separated in a suitable contrivance, and the cooling liquid is conducted back entirely or partially to stage I.

If there should be a third stage III the gas is washed after being cooled in stage II with a suitable washing liquid in order to absorb, for example, sulphur dioxide from the gas.

The cooling of the gas in stage II can also be effected by means of circulating water, which is cooled, for instance, in a heat exchanger and which absorbs chemicals from the gas at the same time as it cools the latter. Part of the current of this circulating water solution is withdrawn and may be conveyed to stage III. It is also possible in certain instances to omit stage III and to add alkaline chemicals instead to the circulating water solution, thereby increasing the capacity of the solution to absorb $SO_2$. One disadvantage in using a circulating aqueous solution in stage II lies, however, in the fact that, as a rule, it will be necessary to clean the cooling liquid (for example oil) used in stage I from the solid chemicals which are caught up in this cooling liquid.

In conventional methods in sulphate pulp mills it is usual to cool down the flue gases to about 125 to 150° C. in a steam boiler and then wash this gas in a water scrubber. The hot water obtained only acquires a moderate temperature, however (approximately 50° C.), and is consequently low-grade.

One of the advantages of the method according to the invention is that a part of the flue gas heat (the part corresponding to the heat contents from the temperature of the entering gas to the dew-point) can be recovered as high-grade heat (for use in producing low pressure steam or hot water heated to high temperatures, for example) as well as providing favourable possibilities for the recovery of chemicals.

The ratio between the quantities of heat recovered from the gas in stage I and in stage II respectively will depend on the temperature of the entering flue gas, its water contents and the temperature after stage II. As there often may be considerably larger quantities of heat in stage II than in stage I it is important that the quantities of the cooling liquid should be adjusted in both stages so as to obtain the best heat economy. By operating with a smaller quantity of cooling liquid in the stage in which the smaller quantity of heat is extracted a smaller difference of temperature is obtained between entering gas and outgoing cooling liquid, so that the heat is utilized in a better manner. When the same cooling liquid is used in stages I and II this favourable effect can—if the smallest quantities of heat are recovered from stage I—be obtained by shunting part of the cooling liquid from stage II back to stage I.

If the cooling liquid deriving from stage I and heated to a high temperature is used to generate low-pressure steam or high-grade hot water, it is desired to heat the cooling liquid by means of entering gas to a temperature as high as possible and, at the same time, to obtain a large quantity of heat. This can be gained by controlling the quantity of cooling liquid according to the difference in temperature between entering gas and outgoing cooling liquid from stage I.

The flue gases obtained in the combustion of waste sulphite liquor, for example, from boiling with digestion agents on sodium basis, contain chemicals in the form of dust ($Na_2CO_3$, $Na_2SO_4$ etc.) as well as in the form of gas (chiefly $SO_2$). The alkaline salts as well as the sulphur dioxide constitute valuable chemicals in the boiling process, which it is desirable to recover for reasons of economy, while it at the same time is of value to utilize the heat contents of the flue gas in the best possible way.

The dust that accompanies the flue gas will, as a matter of fact, be almost entirely separated in stage I and—in those cases when the same cooling liquid is used in stage II—accompany this cooling liquid through the intermediary cooler to stage II. Preferably, the cooling liquid may be an oil, the properties of which have been adjusted for the purpose (low vapor pressure at the existing temperature of treatment, slight mixing capacity with water, satisfactory heat resistance, highly inoxidizable, readily separable from water). Appropriate cooling liquids are fractions of aliphatic hydrocarbons, aromatic hydrocarbons or naphthalenes or individual organic or inorganic compounds or mixtures thereof. The solubility of the alkaline salts in cooling liquids of the above-indicated kind is practically nil. During the cooling in stage II the water condensed out will, on the other hand, dissolve these salts so that the cooling liquid is purified in this way in conformity with the alternative just mentioned.

As the dust is, as a rule, alkaline a part of the sulphur dioxide of the gas will be absorbed already during the cooling in stage II by the aqueous alkaline solution formed. How large a part of the total $SO_2$ content is absorbed in this stage depends partly on the purification of the flue gas before entering the recovering plant, partly on the nature of the waste liquor. The less satisfactory the separation of the dust before stage I the more alkaline ashes are supplied to stages I and II, and the more material is absorbed in stage II. In the event of the waste lye consisting of ammonium lye, the quantity of dust will, however, be slight and absorption in stage II consequently small.

The recovery of sulphur dioxide and other gaseous chemicals can be effected in a special stage III after the two first stages. As absorption liquid one may here choose between either an aqueous solution with pH greater than 4.5, or some compound or solution which is known as suitable for the absorption of sulphur dioxide, for example dimethyl aniline or an ammonium hydrogen sulphite solution from which sulphur dioxide can subsequently be recovered in a known manner in a concentrated form. In normal cases, however, the sulphur dioxide content in the flue gas is so low that the absorption is best effected with an alkaline solution which will be used later in the process. Such suitable liquids are white lye at sulphate pulp mills, soda solution or sulphite solutions at sodium sulphite pulp mills. It will also be a good idea to allow the aqueous phase from the separation after stage II to be incorporated entirely or partially in the washing liquid in stage III.

One embodiment of a plant for carrying out the invention is shown in the accompanying drawing, illustrative of the situation where the invention is applied to flue gases from a steam boiler stoked with evaporated waste lye from an acid sodium sulphite pulp process. The flue gases which are obtained as a result of this process contain dust, principally in the form of sodium carbonate and sodium sulphate. The $SO_2$ content is about 0.6% (calculated on dry gases) and the water dew-point is about 60° C.

Moist flue gases from combustion of cellulose waste lyes are introduced through a pipe 1 at a temperature of 135° C. in stage I, which in the present instance includes a scrubber 2 with filler bodies 3. The gas encounters the cooling liquid which does not absorb water to a high degree, and is supplied to the scrubber through a pipe 4 and jets 5. The gas is cooled, for example to 70° C., without any condensation of water taking place. The cooling liquid is heated in stage I to a temperature of 125° C. and is pumped by a pump 6 through a heat exchanger 7 designed as a steam generator for low pressure steam, and a heat exchanger 8 in which water is heated and the cooling liquid cooled simultaneously, for example to 20° C. before said liquid is conveyed to stage II via pipe 9 through jets 10. The quantity of cooling liquid passing through stage I is controlled automatically by a valve 11 the action of which is governed by the difference in temperature between ingoing gas at 1 and outgoing cooling liquid from stage I by means of a control device 12.

The gas from stage I passes through a pipe 13 to stage II, which for example is provided with a scrubber 14 with filler bodies 15. In passing through the scrubber 14 the gas is cooled to 30° C. with condensation of a corresponding quantity of water. The cooling liquid-water mixture passes through a pipe 16 to a separator 17, in which the cooling liquid and the aqueous condensate are separated from each other.

The cooling liquid is conveyed by a pump 18 from separator 17 partly through the pipe 4 to stage I, partly to the cooler 8 through a pipe 19. A pump 20 passes the aqueous condensate from the separator 17 through a pipe 21 to stage III.

The gas from stage II is conducted through a pipe 22 to stage III, where it in a scrubber 23 having filler bodies 24 is washed with an alkaline solution consisting of a mixture of the aqueous condensate from the separator 17 cooled in the cooler 25, and a carbonate solution which is introduced through a pipe 26. The mixture is supplied to the scrubber through a pipe 27 and jets 28. The greater part of the sulphur dioxide is absorbed by the alkaline mixture in the scrubber 23, and the resulting solution is pumped from the scrubber by a pump 29 and returned to the cellulose pulp boiling process.

The washed gases from stage III are allowed to escape into the atmosphere through a chimney 30.

The embodiment now described is only one example of a design of the invention. The apparatus, as well as the process, can naturally be modified according to local conditions and circumstances within the scope of the invention.

Thus instead of scrubbers with filler bodies as shown in the drawing, other kinds of absorption apparatus can be used, for example spray scrubbers, cyclone scrubbers, so-called Venturi- and Peace-Anthony scrubbers, scrubbers with mechanical spraying devices, centrifugal scrubbers and so on.

In certain cases a special type of scrubber may be preferable. In absorption of $SO_2$ in alkaline solutions it is desirable to avoid oxidation of the absorbed sulphur dioxide into sulphate. It has been found that the interval for the contact between solutions and gas in the scrubber should be short, and for this purpose a Venturi or a centrifugal scrubber, for example, is very suitable.

This also applies to conditions when there is an oxidizing decomposition of the cooling liquid at the relatively high temperatures in stage I.

What I claim is:

1. The method for recovering chemical substances for reuse in producing cellulose and at the same time also heat from moist flue gas resulting from the combustion of cellulose waste liquors which comprises, cooling said moist flue gas in a first stage to a temperature slightly above the water dew point by bringing said gas into heat exchange engagement with a non aqueous cooling liquid not dissolving water to any appreciable extent to extract heat from said gas without condensing the moisture contained therein, heating said cooling liquid in the cooling of said gas, entrapping solid substances from said gas in said cooling liquid, further cooling said already cooled gas in a second stage to a temperature below the dew point by bringing said cooled gas into heat exchange engagement with cooling liquid at a lower temperature than in said first stage to condense the moisture in said gas to an aqueous condensate, bringing said entrapped solid particles together with cooling liquid from the first and second stages into contact with and dissolving them at least partly in said aqueous condensate, separating said aqueous condensate from said cooling liquid.

2. The method as in claim 1 and including passing the cooled flue gas remaining from the second stage to a third stage and washing said gas in said third stage with an absorptive liquid to absorb desired gaseous substances from said gas.

3. The method for recovering chemical substances for reuse in producing cellulose and at the same time heat from moist flue gas resulting from the combustion of cellulose waste liquors which comprises, cooling said moist flue gas in a first stage to a temperature slightly above the water dew point by bringing said gas into heat exchange engagement with a non-aqueous cooling liquid not dissolving water to any appreciable extent to extract heat from said gas without condensing the moisture contained therein, heating said cooling liquid in the cooling of said gas, entrapping solid substances from said gas in said cooling liquid, further cooling said already cooled gas in a second stage to a temperature below the dew point by bringing said cooled gas into heat exchange engagement with cooling water at a lower temperature than in the first stage to condense the moisture in said gas to an aqueous condensate, forming together with said cooling water an aqueous medium, absorbing solid substances from said gas in said aqueous medium in said second stage, utilizing said aqueous medium with said particles dissolved therein as washing liquid for absorbing gaseous substances from said gas, and subsequently transferring this liquid with gaseous substances absorbed therein to the cellulose producing process.

References Cited in the file of this patent

UNITED STATES PATENTS

| | | |
|---|---|---|
| 1,652,956 | Purtyman | Dec. 13, 1927 |
| 2,708,490 | Guinot | May 17, 1955 |
| 2,838,135 | Pilo et al. | June 10, 1958 |
| 2,843,217 | Von Linde | July 15, 1958 |

OTHER REFERENCES

Endebrock: abstract of application Serial Number 101,527, published March 24, 1953, 668 O.G. 1124.